United States Patent [19]
Piirainen et al.

[11] Patent Number: 5,944,844
[45] Date of Patent: Aug. 31, 1999

[54] METHOD FOR DETERMINING CONNECTION QUALITY IN A RECEIVER UTILIZING A VITERBI DECODER

[75] Inventors: Olli Piirainen; Kari Jyrkkä, both of Oulu, Finland

[73] Assignee: Nokia Telecommunications OY, Espoo, Finland

[21] Appl. No.: 08/894,599

[22] PCT Filed: Feb. 22, 1996

[86] PCT No.: PCT/FI96/00106
§ 371 Date: Aug. 22, 1997
§ 102(e) Date: Aug. 22, 1997

[87] PCT Pub. No.: WO96/26583
PCT Pub. Date: Aug. 29, 1996

[30] Foreign Application Priority Data

Feb. 23, 1995 [FI] Finland ..................................... 950843

[51] Int. Cl.⁶ .............................. G06F 11/10; H04L 27/06
[52] U.S. Cl. ........................................... 714/704; 375/341
[58] Field of Search .................................... 371/5.1, 20.1, 371/20.4, 37.8, 37.06, 43.4, 43.7, 64, 67.1, 68.2; 395/183.01; 375/222, 219, 341, 43, 94, 96; 714/704, 18, 20, 21, 47, 48, 52, 57, 705, 792, 799, 795

[56] References Cited

U.S. PATENT DOCUMENTS

| | | | |
|---|---|---|---|
| 5,099,499 | 3/1992 | Hammar | 375/94 |
| 5,144,644 | 9/1992 | Borth | 375/96 |
| 5,157,672 | 10/1992 | Kondou et al. | 371/43 |
| 5,181,209 | 1/1993 | Hagenauer et al. | 371/43 |
| 5,414,738 | 5/1995 | Bienz | 375/341 |
| 5,469,452 | 11/1995 | Zehavi | 371/43 |
| 5,537,444 | 7/1996 | Nill et al. | 375/341 |
| 5,541,955 | 7/1996 | Jacobsmeyer | 375/222 |
| 5,550,870 | 8/1996 | Blaker et al. | 375/341 |
| 5,627,845 | 5/1997 | Asano et al. | 371/43 |
| 5,719,871 | 2/1998 | Helm et al. | 370/479 |
| 5,727,029 | 3/1998 | Jeon et al. | 375/341 |

FOREIGN PATENT DOCUMENTS 2 232 854   12/1990   United Kingdom .

OTHER PUBLICATIONS

Hagenauer et al., "A Viterbi Algorithm with Soft–Decision Outputs and its Applications", Dallas Globecom '89, IEEE Global Telecommunications Conference & Exhibition, Nov. 27–30, 1989, vol. 3, pp. 1680–1686.

*Primary Examiner*—Robert W. Beausoliel, Jr.
*Assistant Examiner*—Nadeem Iqbal
*Attorney, Agent, or Firm*—IP Group of Pillsbury Madison & Sutro LLP

[57] ABSTRACT

A receiver and a method for determining connection quality in a cellular radio system. Received signals are decoded with a Viterbi decoder. Decision variables, representing decisions, are converted into a float value format. The converted decision variables are stored in a memory unit. During a traceback step of a Viterbi algorithm, a sum of absolute values of stored ones of the decision variables, which are in a correct path, are calculated and a minimum value of the absolute values of the stored ones of the decision variables in the correct path is calculated. The sum of the absolute values is averaged over a desired measurement period and compared to a predetermined threshold to obtain a bit error rate over a connection. Faulty signal frames are detected based on the minimum value of the absolute values.

10 Claims, 2 Drawing Sheets

METHOD FOR DETERMINING CONNECTION QUALITY IN A RECEIVER UTILIZING A VITERBI DECODER

This application is the national phase of international application PCT/FI96/00106 filed Feb. 22, 1996 which designated the U.S.

BACKGROUND OF THE INVENTION

1. Field of the Invention

The invention relates to a method for determining connection quality in a receiver of a cellular radio system. In the method, a received signal is decoded with a Viterbi decoder whose output provides, in addition to the decoded symbols, estimates of the merit of the decisions made.

The invention also relates to a receiver comprising means for decoding a received signal in accordance with the Viterbi algorithm. The means calculates estimates of the merit of decisions made in addition to decoding the received symbols.

2. Description of Related Art

In a cellular radio system, the quality of the connection between a base station and a subscriber terminal varies continuously. This variation is due to disturbances in the radio path and to the attenuation of radio waves as a function of distance. For example, when a terminal moves further away from the base station, attenuation over the connection between the terminal and the base station increases. It is often attempted to compensate for this attenuation by gain control.

Gain measurement as such is not a sufficient parameter for estimating connection quality. A unit universally employed to express connection quality in digital cellular radio systems is the bit error rate (BER), representing the number of incorrectly received bits compared to all received bits. In the GSM cellular radio system, for example, the base station and the terminal are continuously measuring the bit error rate at the air interface. The results of the measurement are transferred to a base station controller that makes a decision, according to the measurement result, on a handover to a channel offering better connection quality, if necessary.

The bit error rate measurement must be as accurate as possible to enable optimum utilization of the resources of the cellular radio system and to minimize the number of poor connections. In the GSM system, for instance, the performance of the bit error rate measurement has been specified in the GSM 05.08 specification, which is incorporated herein by reference. In accordance with this specification, the measurement period for the bit error rate is 480 milliseconds, which corresponds to 104 TDMA time slots with full rate channels and 52 TDMA time slots with half rate channels.

Estimating the channel bit error rate by 'pseudober' measurement is previously known. In this method, the bit error rate is estimated by encoding the channel decoding result again and calculating the number of corrected bits. This is not the best possible method, however, since there is no guarantee that the channel decoder always corrects an erroneous bit. The channel decoder may also change a correct bit into an incorrect bit. In addition, the accuracy of the method is very much dependent on the length of the bit sequence being treated. The bit sequence, i.e. the measurement period, should be long enough to enable correct detection of the bit error rate also when erroneous bits occur seldomly in the channel. In GSM, this will present a problem particularly in half rate channels wherein the number of bits is smaller than in full rate channels.

Another known method for estimating the bit error rate is to calculate the bit error rate from the known training sequence in each traffic channel during the measurement period. Since in the GSM system there are 26 bits in the training sequence and over a half rate channel there are 52 frames during a measurement period in each traffic channel, there are only 52*26 known bits wherefrom the bit error rate could be calculated. This is too few to be able to produce a sufficiently accurate bit error rate estimate.

Utilizing Viterbi decoder soft decision outputs to improve the signal-to-noise ratio of the received signal, as accounted for in J. Hagenauer, P. Hoeher, *A Viterbi algorithm with soft decision outputs and its applications*, IEEE, GLOBECOM 1989, Dallas, Tex., Nov. 1989, which is incorporated herein by reference is previously known.

SUMMARY OF THE INVENTION

It is an object of the present invention to implement a method enabling accurate estimation of the bit error rate even with low bit numbers, which occur in a half rate channel. In the method of the invention, the estimation accuracy is not as dependent on the length of the bit sequence as in the pseudober method. Furthermore, less computation is needed than heretofore.

This is achieved with a method, which is characterized in that estimates calculated by a Viterbi decoder of the merit of the decisions made are converted into float value format, and said estimates are utilized in determining the connection quality.

The receiver in accordance with the invention is characterized in that means (25) comprise means (54) for converting the decision variables representing soft decisions into float value format, and the receiver comprises means for calculating the bit error rate over the connection on the basis of the calculated estimates.

The basic idea of the invention is to utilize the soft decisions obtained from the Viterbi decoder in a novel way to calculate the bit error rate. In the method of the invention, the soft decisions are provided in the Viterbi decoder simultaneously with the bits to be detected such that in calculating the decision metrics in the trellis diagram, part of the decision variables representing the decisions are converted into float value format and stored in a memory unit. When the traceback step of the Viterbi algorithm is performed, the sum of the absolute values of stored decision variables in the correct path and the minimum value of the absolute values of the decision variables in the corresponding path are calculated.

The method of the invention provides more accurate bit error rate calculation than the pseudober method. The method is particularly suitable for use in a half rate channel, as it does not require an equally high number of bits to give a reliable estimate of the bit error rate. Also, the method has less computational complexity, since in the method of the invention the requisite soft decisions can be generated in the Viterbi decoder in the same time that the actual decoding requires. The pseudober method requires extra calculation.

BRIEF DESCRIPTION OF THE DRAWINGS

In the following, a preferred embodiment of the invention will be explained in greater detail with reference to the examples in accordance with the accompanying drawings, in which.

DETAILED DESCRIPTION OF THE INVENTION

The method of the invention can be used in any digital cellular radio system in which bit error rate measurement is performed over the connection. In particular, the most significant advantage of the invention is gained over connections with low bit numbers, such as the GSM system half rate channel. In the following, the invention will be described in the context of the GSM system.

Figure 1:
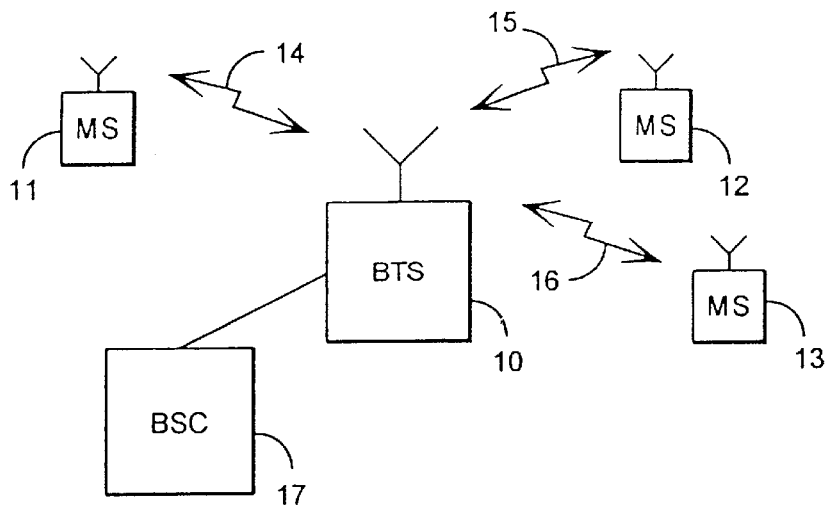
FIG. 1 illustrates a cellular radio system in which the method of the invention can be used.

The construction of a cellular radio system, with parts essential to the invention, is as illustrated in FIG. 1. The system comprises a base station 10 and a plurality of normally mobile subscriber terminals 11–13 that are in two-way communication 14–16 with the base station. The base station switches the connections of the terminals to a base station controller 17, which switches them further to other parts of the system and to the fixed network. The base station controller 17 controls the operation of one or more base stations. In the GSM system, both the base station and the terminals continuously measure the bit error rate over the connection between them and transmit the results to the base station controller.

The solution in accordance with the invention utilizes the soft decisions obtained from the Viterbi decoder. The soft decisions provided by the channel decoder along with bit decisions, i.e. estimates of the merit of the decisions made, are averaged over a desired measurement period. The resultant averaged value is compared to predetermined threshold values. Each threshold value is set to correspond to a given bit error rate value in the channel, and estimate of the bit error rate is obtained as a result of the comparison. The threshold values can be set in type testing measurements on receivers, for instance, in which a known bit pattern is sent through different channel configurations at different signal-to-noise ratios, which enables calculation of actual bit error rate values for different signal-to-noise ratios and channel types. At the same time, averaged soft decisions corresponding to the actual bit error rates are obtained.

In the solution in accordance with the invention, the soft decisions are generated in the Viterbi decoder simultaneously with the bit decisions. When the decision metrics of the trellis diagram are calculated, part of the decisions are converted from integer format into float value format and stored in a memory unit. In performing the 'traceback' step, i.e. tracing the state transitions in the trellis diagram in the reverse order, the sum of the absolute values of the stored soft decision variables in the correct path (SDVSUM) and the minimum value of the absolute values of the decision variables in the corresponding path (SDVMIN) are calculated. As described previously, said SDVSUM value is averaged over the measurement period and compared to the set threshold values to determine the bit error rate. The SDVMIN value enables detection of received faulty signal frames.

Figure 2:
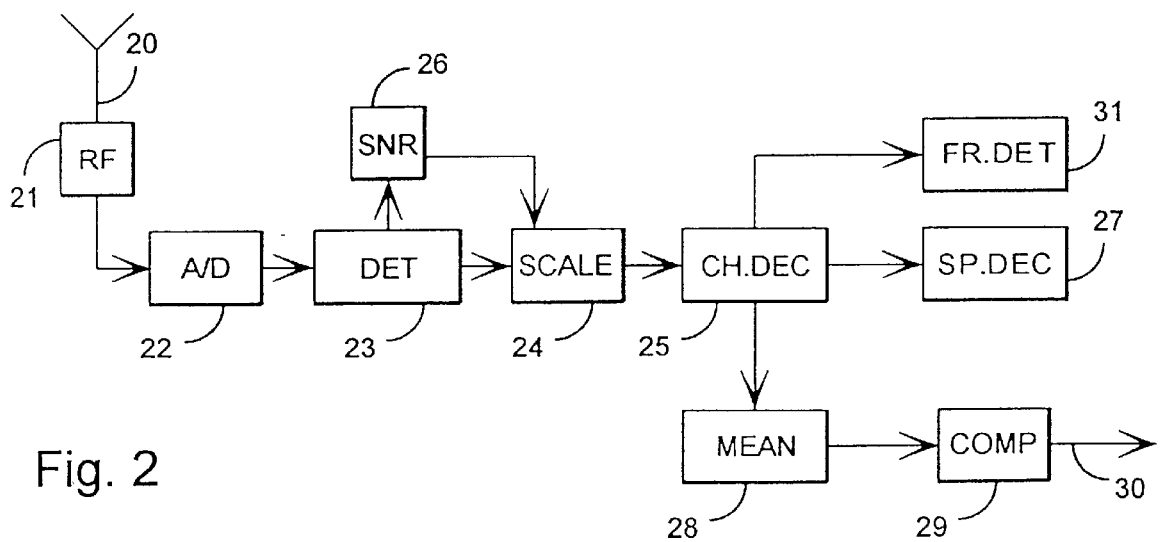
FIG. 2 illustrates an example of the construction of a receiver of the invention on block diagram level.

In the following, the construction of the receiver implementing the method of the invention will be explained in more detail. FIG. 2 illustrates an example of a receiver in accordance with the invention by means of a block diagram. The receiver comprises an antenna 20 through which a received signal is applied to radio-frequency parts 21 in which the signal is translated to intermediate frequency. From the radio-frequency parts the signal is applied to converter means 22 in which the signal is converted from analog into digital form. Detector means 23 preferably providing the initial bit decisions using the Viterbi algorithm in a known manner, is operationally connected to the converter means. The Viterbi detector has connected to it means 26 for estimating the signal-to-noise ratio, and the output of these means is applied to scaling means 24 in which the soft bit decisions from the output of the detector are scaled in accordance with the signal-to-noise ratio. This scaling will improve the channel decoder performance. The scaled signal is further applied to a Viterbi channel decoder 25.

The decoder 25 performs the final detection and decoding of the received signal in accordance with the Viterbi algorithm. The receiver of the invention utilizes the soft decisions obtained in the decoding, i.e. the terms SDVSUM and SDVMIN described above. In the receiver of FIG. 2, the decoded signal is further applied to a speech decoder 27. The calculated SDVSUM value is applied to calculation means 28 in which the received values are averaged over the measurement period, preferably 480 ms in the case of GSM. The averaged estimate is applied to comparator means 29 in which the estimate obtained is compared to predetermined threshold values. As a result of the comparison, a good estimate 30 of the bit error rate is obtained, and this is further applied to the other parts of the receiver. Likewise, the decoder 25 calculates the term SDVMIN described above, and this is applied to means 31 in which faulty signal frames are detected.

Figure 3:
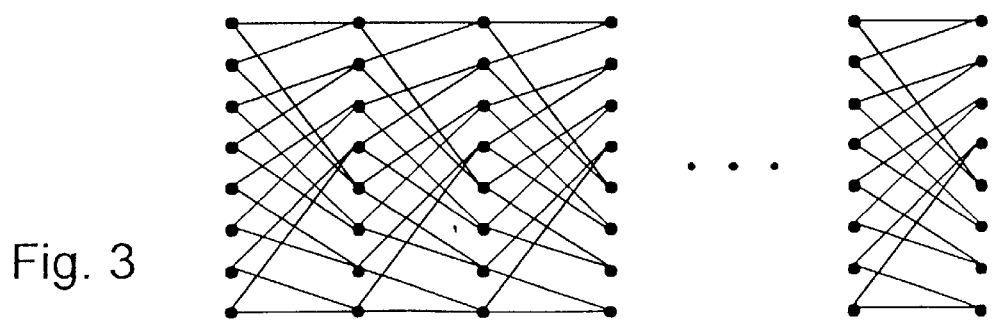
FIG. 3 illustrates an example of a trellis diagram employed in a Viterbi decoder.

The following is a more detailed description of the operation of the Viterbi decoder and the method of the invention for generating soft decisions. FIG. 3 illustrates a typical trellis diagram employed in connection with the Viterbi algorithm. The figure represents an eight-state trellis diagram. The solving of the Viterbi algorithm proceeds from the left to the right in the trellis diagram. Each point can be reached by two different routes, and at each point the better of the two routes arriving at said point is chosen, and this information is stored. Besides a mere hard bit decision (0 or 1), information on the merit of the decision ('soft decision') can also be stored, thus increasing the memory capacity required for each point in the trellis diagram. For a soft decision, a memory having a minimum of

K=AM_SB * AM_ST * SOFT_WL bits is required, where

AM_SB=number of bits on which a soft decision is stored

AM_ST=number of Viterbi states

SOFT_WL=word length used in the soft decision.

As will be seen from the above formula, the memory capacity required increases directly in accordance with the word length employed in the soft decisions. Furthermore, the time available for data processing is normally limited, and therefore the processing of the soft decisions must be performed with a minimum of cycle time.

In the solution in accordance with the invention, the Viterbi algorithm is realized with the aim of maximizing the decision variable obtained at each Viterbi node point, i.e., the better the decision, the higher the number representing the decision. Furthermore, all fixed point values are presumed to be in two's complement form.

Since the capacity of the memory storing the decisions is dependent on the word length of the value representing the soft decisions, in the approach of the invention the soft decisions obtained in the executing block are converted into float value format prior to being stored. For example 16-bit soft decisions can be compressed into a float value comprising eight bits, which will cut the memory requirement for the soft decisions by half. This is a significant advantage especially if the Viterbi algorithm is realized by an ASIC technique. On the other hand, if the decisions were stored as fixed point values, having the word length of the float numbers, this would not provide as useful a value range as the present solution.

Figures 4, 5:
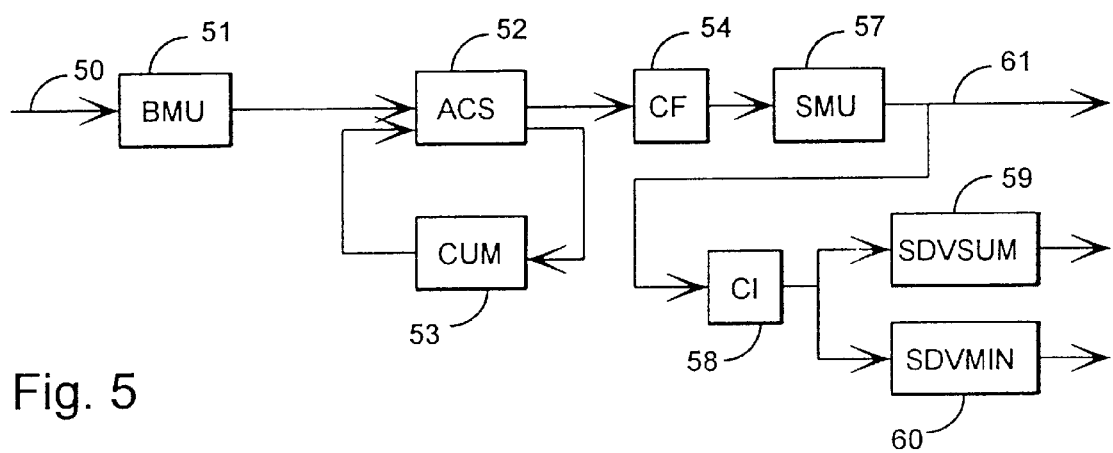
FIG. 4 illustrates an example of the format of a float value employed in the method of the invention.
FIG. 5 illustrates in greater detail the construction of a receiver of the invention by means of a block diagram.

FIG. 4 illustrates a possible float number format. In the format, the first bit indicates the sign (Sgn.), the next four bits the mantissa (Mant.) starting from the most significant bit, and the last three bits the exponent (Exp.) starting from the most significant bit. With this notation, values $(1-2*Sgn) * Mant * 2^{ExP}$ can be represented. To convert a 16-bit decision variable into a float number, the decision variable is first saturated to have 12 bits. This means that if the variable is outside the value range that can be represented by 12 bits, the largest or smallest value that can be represented by 12 bits is scaled as the value of the variable. Thereafter the resultant 12-bit value is converted into the above float number format and stored.

The traceback step proceeds from the right to the left in the trellis diagram. During this step, bit decisions regarding the received bits are made on the basis of the stored information. This is performed by tracing the state transitions in the trellis diagram in the reverse order, and choosing the correct state transition at each node point in the path in accordance with the decision stored at the corresponding node point, and proceeding to the node point next to the state transition relating to the decision. A decision bit to be read from memory is at the same time a hard decision to be obtained from the Viterbi as regards the bit at that column.

In the solution in accordance with the invention, information on the merit of the decision in float number format is stored at each node point in addition to the mere decision. In the traceback step, the hard decision can, in the receiver of the invention, be read from the Sgn bit, indicating whether the decision was negative or positive. Simultaneously with performing the traceback step, the sum of the absolute values SDVSUM of the soft decisions in the correct path and the minimum value SDVMIN of the absolute values of the soft decisions in the correct path are also calculated from the stored float value number. These two values are returned together with the obtained hard bit decisions for use in external processing.

To calculate the SDVSUM value, at each node point the float number read from memory is first converted into 16-bit format. The absolute value of the value obtained is added to a cumulative sum SDVSUM. The absolutized value obtained at each node point and read from memory is also compared to the current SDVMIN value, and if the value that is read is smaller, SDVMIN will receive the value of the number read. Prior to the initiation of the traceback step, SDVSUM has been initialized to 0 and SDVMIN to 7ff. In the manner described above, the SDVSUM and SDVMIN values representing the soft decisions made can be read in the traceback step simultaneously with the hard bit decisions without using any extra cycle time.

FIG. 5 illustrates by means of a block diagram one possible embodiment for implementing a Viterbi decoder. As described previously, the Viterbi algorithm is solved by proceeding from the left to the right in the trellis diagram. Each point can be reached by two different routes, and at each point the better of the routes arriving at said point is chosen, and this information is stored. Input data 50 is first entered into a Transition Branch Metrics Unit (BMU) 51. At each point, the BMU forms a value corresponding to each route by which that point is reached. A Cumulative Metrics Memory (CUM) unit 53 stores the values previously calculated for each point of the column.

An Add-Compare-Select (ACS) unit 52 compares the variables calculated in the BMU with one another, selects the value giving the better result, and adds said value to the sum obtained from the CUM unit; the resultant point-related value is stored in the CUM unit 53 for calculating the next column. The value obtained is stored for the traceback step in a Survivor Memory Unit (SMU) 57 as well, and in the solution in accordance with the invention the decoder comprises means 54 for converting the value into float value format as described above for saving storage space and for the soft decisions.

The traceback step is performed in the memory unit 57 by travelling through the trellis diagram in the reverse direction, as described above, and the memory unit as such can be implemented in a manner known to those skilled in the art. At each point in the diagram, the value stored in the memory unit is read, and the Sgn bit directly gives a hard decision 61, which is applied to the other parts of the receiver. For soft decisions, the value that has been read is applied to means 58 in which the value is converted into 16-bit format, and the resultant value is applied to first calculation means 59 calculating the sum of the absolute values of the values obtained, SDVSUM, and to second calculation means 60 calculating the minimum value of the absolute values of the values obtained, SDVMIN. On the basis of these calculated results, the bit error rate over the connection can be estimated and faulty signal frames detected.

Even though the invention has been explained in the above with reference to examples in accordance with the accompanying drawings, it is understood that the invention is not restricted to them but can be modified in a variety of ways within the scope of the inventive idea disclosed in the attached claims.

We claim:

1. A method of determining connection quality in a receiver in a cellular radio system, said method comprising:

decoding a received signal with a Viterbi decoder, an output of said Viterbi decoder including a plurality of decoded symbols and estimates of a merit of a plurality of decisions, said decoding comprising:
  calculating decision metrics in a trellis diagram, said calculating comprising:
    converting a part of a plurality of decision variables, representing said decisions, into a float value format,
    storing said part of said plurality of decision variables converted into said float value format into a memory unit,
  performing a traceback step of a Viterbi algorithm,
  calculating, during said performing of said traceback step, a sum of a plurality of absolute values of ones of said stored decision variables in a correct path, and
  calculating, during said performing of said traceback step, a minimum value of said absolute values of said ones of said stored decision variables in said correct path.

2. The method of claim 1, further comprising:

determining a bit error rate over a connection based on said estimates; and detecting at least one possible incorrect signal frame based on said estimates.

3. The method of claim 1, further comprising:

averaging said estimates of said merit of said decisions over a desired measurement period to produce an averaged value; and comparing said averaged value to predetermined threshold values, corresponding to different bit error rate values.

4. The method of claim 1, further comprising:

averaging, over a desired measurement period, said sum of said absolute values of said ones of said stored decision variables in said correct path to produce an averaged value; and comparing said averaged value to a predetermined threshold value to obtain a bit error rate over a connection.

5. The method of claim 1, further comprising:

detecting at least one faulty signal frame based on said minimum value of said absolute values of said ones of said stored decision variables in said correct path.

6. The method of claim 2, wherein said determining said bit error rate comprises:

averaging said sum of said absolute values of said ones of said stored decision variables in said correct path to produce an averaged value; and comparing said averaged value to a predetermined threshold value to obtain said bit error rate.

7. The method of claim 2, wherein said detecting at least one possible incorrect signal frame is based on said minimum value of said absolute values of said ones of said stored decision variables in said correct path.

8. A receiver comprising:

means for decoding a received signal, in accordance with a Viterbi algorithm, and for calculating estimates of a merit of decisions, said decoding means comprising:

means for converting a plurality of decision variables, representing a plurality of soft decisions, into a float value format, means for temporarily storing said decision variables, representing said plurality of soft decisions, converted into said float value format, means for reconverting said decision variables, converted into said float value format, into an integer format, means for calculating a sum of ones of said temporarily stored decision variables in a correct path, and means for calculating a minimum value of a plurality of absolut e valu es of said ones of said temporarily stored decision variables in said correct path; and means for calculating a bit error rate over a connection based on said calculated estimates.

9. The receiver of claim 8, further comprising:

means for detecting at least one incorrect signal frame based on said estimates.

10. The receiver of claim 8, further comprising:

means for averaging said calculated estimates over a desired measurement period to produce an averaged value; and means for comparing said averaged estimate to predetermined threshold values set to correspond to different bit error rate values.

* * * * *